United States Patent [19]

Blake

[11] 4,205,093

[45] May 27, 1980

[54] FOOD PRODUCT CONTAINING ORANGE CITRUS JUICE VESSICLE SOLIDS

[75] Inventor: Jon R. Blake, Brooklyn Center, Minn.

[73] Assignee: General Mills, Inc., Minneapolis, Minn.

[21] Appl. No.: 967,443

[22] Filed: Dec. 7, 1978

[51] Int. Cl.$^2$ .......................... A23B 7/10; A23L 1/212
[52] U.S. Cl. ................................ 426/333; 426/616; 426/639; 426/658; 426/660; 426/661
[58] Field of Search .............. 426/333, 615, 616, 639, 426/640, 658, 661, 506, 521, 577, 660, 810

[56] References Cited

U.S. PATENT DOCUMENTS

| | | | |
|---|---|---|---|
| 2,510,679 | 6/1950 | Bruce | 426/616 |
| 2,858,221 | 10/1958 | Laurie | 426/616 |
| 2,865,757 | 12/1958 | Avrell | 426/558 X |
| 2,938,796 | 5/1960 | Zick | 426/332 X |
| 2,952,548 | 9/1960 | Work | 426/302 X |
| 3,112,202 | 11/1963 | Wadsworth | 426/616 |
| 3,190,756 | 5/1965 | Avrell | 426/653 X |
| 3,196,020 | 7/1965 | Work | 426/302 |
| 3,239,359 | 3/1966 | Stansbary | 426/616 X |
| 3,246,993 | 4/1966 | Webster et al. | 426/616 |
| 3,365,310 | 1/1968 | Webster | 426/616 |
| 3,867,560 | 2/1975 | Mensi et al. | 426/350 |
| 3,998,977 | 12/1976 | Rabeler | 426/144 |
| 4,096,286 | 6/1978 | Sakakibara et al. | 426/577 |
| 4,117,176 | 9/1978 | Taylor et al. | 426/660 |

OTHER PUBLICATIONS

Kesterson et al., "Processing and Potential Uses for Dried Juice Sacs", *Food Technology*, 2-1973, pp. 52-54.

*Primary Examiner*—Arthur L. Corbin
*Attorney, Agent, or Firm*—Gene O. Enockson; John A. O'Toole

[57] ABSTRACT

Disclosed are intermediate moisture food products which contain major amounts of orange citrus juice vessicle solids. The food products also contain from about 12% to 40% of a carbohydrate nutritive sweetener and sufficient amounts of edible organic acid to provide a pH of about 2.5 to 4.5. The food products have a moisture content of from about 8% to 30% and a water activity ranging from about 0.30 to 0.85. The disclosed food products exhibit prolonged moisture retention and microbial stability.

11 Claims, No Drawings

FOOD PRODUCT CONTAINING ORANGE CITRUS JUICE VESSICLE SOLIDS

BACKGROUND OF THE INVENTION

1. Field of the Invention

The present invention relates to elastic solid-form food products which contain citrus-juice pulp solids and which exhibit prolonged moisture retention. More particularly, the present invention relates to intermediate moisture foods especially in cylindrical form comprising sweetened residual citrus juice vessicle solids from orange juice.

2. The Prior Art

Certain waste materials are produced in the manufacture of orange, grapefruit, lemon, etc. juice from the citrus fruit. For years problems with the disposal of the waste citrus material has prompted attempts to utilize this waste material. Initial screening separates layer material such as peel and seeds from the juice. Generally, the layer material is dried, comminuted, and used for cattle feed. Alternatively, the peel material can be elaborately processed to provide purified pectin useful for jelly, jam and the like.

Finer materials (i.e., pulp) associated with the juice are similarly segregated from the juice by screening. A variety of terms have been loosely used in the art to refer to this pulp material or parts thereof in its various physical or processed forms. It has been called at various times in its untreated state, "juice vessicles", "juice sacs" or "finisher pulp". The juice vessicles are the membranes forming the juice sacs. During juicing operations, the juice sacs rupture and release their juice. Thus, for purposes of the present invention "juice vessicles" is used synonymously for the residual citrus juice sac materials remaining after the release of the juice from the juice sac.

The finisher pulp typically is combined with the peel residue and the mixture is used for cattle feed since the pulp is not a good source of pectin compared to the peel itself. In some instances, the pulp is recovered and freeze-dried to be used in dry juice powders which form orange juice drinks when reconstituted with water (see, for example, U.S. Pat. No. 3,246,993 issued Apr. 19, 1966 to R. C. Webster et al). In commercial juice production, the pulp is washed to recover cold water soluble sugars which are present in the pulp material in dilute amounts. Although the cold water soluble sugars are initially present in relatively high concentrations on a dry solids basis, e.g., 30% by weight, on a wet basis the sugars concentration is quite low since the total solids content of the finisher pulp is only 3% to 5%. Some pectin-like materials are also washed away along with the soluble sugars to leave a material dubbed "washed juice vessicles". Both washed and unwashed juice vessicle material which has been drum dried, spray dried or solvent dried has been suggested for use as a food additive. Such suggested utilization is based upon the excellent water-binding and the good oil-binding properties of the material. One reference (see "Processing and Potential Uses for Dried Juice Sacs," by J. W. Kesterson and R. J. Braddock, *Food Technology*, Feb. 1973, pp. 52–54) suggests its utilization in a wide variety of food products, but has no teaching of actual use in any food product.

However, notwithstanding such optimistic speculation concerning potential usage, difficulties have arisen in the practical efforts to utilize the juice vessicle material or protopectin material derived therefrom even in additive amounts. Several art efforts have been made at incorporating small amounts into breads or cakes of treated protopectin derived from citrus residue including from dried vessicles (see U.S. Pat. No. 2,952,548 issued Sept. 13, 1960 to L. T. Work; U.S. Pat. No. 3,190,756 issued June 22, 1965 to W. Aurell; and U.S. Pat. No. 3,196,020, issued July 20, 1965 to W. Aurell). These patents disclose elaborately treating the protopectin with various lipids or colloid materials to decrease the rate or amount of hydration of the protopectins. Without such treatment, these patents teach that the rapid hydration of these extremely hydrophilic materials causes doughs or batters to set quickly into non-elastic solid masses which are unsuitable for bread or cake production. Alternatively, it has been taught that cakes containing small amounts of untreated protopectin can be realized by formulating doughs of low gluten flours such as potato flour. (See for example, U.S. Pat. No. 2,865,757 issued Dec. 23, 1958 to W. Aurell).

Given the above-described problems and difficulties in providing any food products containing even minor amounts of residual juice vessicle material, it is not surprising that no art attempts have realized food products which comprise major amounts of this material. Thus, there is clearly a continuing need for new and useful food products which utilize this previously discarded material and which are organoleptically acceptable for sale as consumer products. Accordingly, it is an object of the present invention to provide edible consumer food products which contain major amounts of residual juice vessicles and which are organoleptically acceptable.

In particular, it is a further object of this present invention to provide snack food products in the form of sweetened residual citrus food vessicles.

In the past, a number of fruit flavor snack or candy products have been marketed or developed. Fruit flavored candy products are usually based upon corn syrup, and include sugar with added artificial flavors or colors. Typically, these products are hard, brittle and non-elastic. Other snack food products include, for example, "Fruit Roll" in various fruit flavors marketed by Knox Gelatin, Inc. This product is characterized by a leathery constituency. It is apparently based on fruit purees or concentrates, gelatins and starch. Even when carefully packaged, however, such snack food products have limited shelf stability due to moisture loss. The moisture loss can lead to such appearance degradation as shriveling and such textural degradation as undesirable increases in toughness and such organoleptic degradation as decreased moist mouthfeel.

Accordingly, it is a further object of the present invention to provide snack food products containing residual juice vessicle material and which exhibit high moisture retention.

It is a further object of the present invention to provide fruit-containing snack food products containing juice vessicle material derived from orange juice and which are moisture stable.

It has been surprisingly discovered that the above objectives can be realized and superior food products provided by formulating compositions comprising certain amounts of conventional sweetening agents, juice vessicle material, edible acids and having certain moisture contents and moisture activities.

SUMMARY OF THE INVENTION

The present invention relates to elastic solid form food products which contain citrus juice vessicle solids and which exhibit prolonged moisture retention. The claimed compositions comprise from about 12% to 40% of a nutritive carbohydrate sweetening agent, from about 20% to 90% citrus juice vessicle solids, sufficient amounts of an edible organic acid to provide a pH of from about 2.5 to 4.5, and from about 30% to 8% by weight of moisture. The food products have a water activity of from about 0.30 to 0.85. Such food products exhibit extended shelf stabilities by virtue of the combination of low pH and the relatively high degree of water binding. Moreover, the moisture retention of the present food products is markedly enhanced by virtue of the degree of water binding.

Throughout the specification and claims, percentages and ratios by weight and temperatures are in degrees Fahrenheit, unless otherwise indicated.

DETAILED DESCRIPTION OF THE INVENTION

The present invention relates to shelf-stable elastic, solid form food products which exhibit prolonged moisture retention and which contain large amounts of citrus juice vessicle solids. These food products essentially contain a nutritive carbohydrate sweetener, juice vessicle solids, an acidulant and moisture. Each of these solid form food product ingredients as well as product preparation and product use, are described in detail as follows.

A. Sweetening Agent

A nutritive carbohydrate sweetening agent is essentially employed in the present food product at about 12% to 40% by weight. The term "nutritive carbohydrate sweetening agent" is used herein to mean those typical sweetening agents conventionally used in food products. Of course, the present nutritive carbohydrate sweetening agents are to be distinguished from non-nutritive carbohydrate sweetening agents such as saccharin, cyclamate, and the like. Additionally, the present carbohydrate sweetening agents are to be distinguished from such protein-based sweetening agents as aspartame, thaumatin and monellin.

The nutritive carbohydrate sweetening agent can contribute to the total solids content of the present food product. The total solids content of the present food products will range between about 70% to 92% by weight. Better results are achieved when the present sweetening agents are employed at levels of from about 15% to 30% by weight of the present food products. Best results are realized when the nutritive carbohydrate sweetening agent is present at levels of about 18% to 24%.

Suitable materials for nutritive carbohydrate sweetening agents are well known in the art. Examples of such sweetening agents include sugars such as sucrose, invert sugar, dextrose, lactose, honey, maltose, fructose, maple syrup and corn syrup solids. Preferred nutritive carbohydrate sweetening agents are selected from the group consisting of sucrose, glucose, fructose, corn syrup solids and honey. Highly preferred nutritive carbohydrate sweetening agents are selected from the group consisting of sucrose, corn syrup solids and fructose. Of course, mixtures of the above-noted materials are contemplated herein.

While the above-exemplified sweetening agents are available in highly purified forms, other sources of sweetening agents which are not as highly purified can be used. For example, a relatively inexpensive material such as apple juice powder (or "apple powder" as it is commercially labeled) which is approximately 70% by weight (dry basis) sugars can be employed as a nutritive sweetening agent. If used, such impure sources of sugars are employed at levels based upon their total sugars content. Examples of other suitable materials of this kind include dry fruit, semi-moist fruit, fruit purees, fruit juice and fruit nectars.

B. Juice Vessicle Solids

Citrus juice vessicle solids is an essential ingredient of the present food product. The juice vessicle solids provide the structuring and the bulk to the present food products. The juice vessicle solids are present in amounts of from about 20% to 90% in the present food products. Superior results in terms of moisture retention and texture are achieved when the juice vessicle solids are present at from about 22% to 45%. Best results are achieved when the juice vessicle solids concentration ranges from about 30% to 40%.

The juice vessicles from other citrus fruits such as lemon and grapefruit have strongly bitter tastes. Accordingly, orange citrus vessicles are highly preferred for use herein.

Juice vessicle solids can be supplied from stabilized raw juice vessicles pasteurized by heating at 180° F. or higher for 0.25 hours or longer. Typically, the solids concentration of raw, pasteurized or "stabilized" juice vessicles is from about 2% to 5%. Accordingly, when raw, stabilized juice vessicles are used to supply the juice vessicle solids, a drying step is required in the present food product preparation method (described below) in order to control the food product moisture content within the given essential ranges.

In another embodiment of the present invention, the juice vessicle solids are supplied from processed juice vessicles. As used herein, the term "processed juice vessicle(s)" refers to juice vessicle material whose water content has been reduced from the level of raw juice vessicles by either thermal and/or mechanical means. The term "drying" is used herein to characterize any thermal or radiation means for reducing the water content of the juice vessicle material or the present food products. Processed juice vessicles are thus characterized by the level of moisture remaining after moisture reduction. By controlling the moisture content of the processed juice vessicles, the present food products can be prepared without the necessity for a drying step.

It has been unexpectedly discovered that the food products of the present invention which have been prepared containing highly processed juice vessicles are particularly shelf stable against moisture loss and microbial attack. "Highly processed juice vessicles" are defined as juice vessicle material which ranges from about 3% to 12% moisture on a juice vessicles basis.

Of course, the present food products can be prepared from mixtures of raw citrus juice vessicles and highly processed juice vessicles. In such case, the weight ratio of solids provided by the raw juice vessicles to the solids provided by the highly processed juice solids ranges from about 10:1 to 20:1.

Variations of the particle size of the highly processed juice vessicle material can be used to produce differences in texture. Finely divided material produces smoother textures in the present food products. A coarser texture in the present food products is provided by larger particles of highly processed juice vessicle material.

C. Acidulant

An edible organic acid is another essential element of the present food product. The edible organic acid serves to provide a pH from about 2.5 to about 4.5, preferably from about 3.0 to about 4.3 and most preferably from about 3.8 to 4.2. Maintenance of the pH of the present food products within the above-noted range provides stabilization of the product against microbial attack without the necessity for heat treatment. Typically, edible organic acids are employed at levels of from about 0.3 to 4% by weight of the solid form food product.

A wide variety of edible organic acids or their salts are known in the food art and are usefully employed herein. Examples of suitable materials useful herein as edible organic acids include the water soluble salts of citric acid, succinic acid, tartaric acid, malic acid, acetic acid, lactic acid, itaconic acid and adipic acid. The cations of the salts of such edible organic acids can be sodium, potassium, ammonium and the like. Preferred edible organic acid salts include sodium citrate, potassium citrate, calcium lactate and sodium lactate, etc.

D. Moisture

The present food products have a moisture content which essentially ranges from about 30% to 8%. That is, the total solids level of the present food products ranges from about 70% to 92%. Superior results are obtained when the water content ranges from 16% to 22%. Maintenance of the water content within the specified ranges is important to the realization of food products having a cohesive structure which does not crumble or fall apart. To some extent, the moisture content influences the textural properties of the present food products. Generally, those food products with lower moisture contents exhibit tougher, more chewy characteristics.

Control of the moisture content can be obtained by limiting the amount of total water supplied to a given formulation. Alternatively, excess water can be added to a mixture of essential and optional ingredients of the present invention, and the excess water removed by conventional drying techniques. In the composition preparation which is more fully described below, after shaping a mixture of the present ingredients into any desired geometric configuration, the present food products are obtained by such drying techniques as microwave or infrared radiating, oven drying or forced air drying to any desired moisture content within the specified essential moisture content range.

Importantly, the water which is contained by the present food products is present not totally in a free state but rather is partially bound. The degree to which water is bound in a food product is characterized by the water activity of the food product. The water activity of any food product will be in the range of 0.00 to 1.00. The water activity of the present food products at equilibrium (24 hours) should range from about 0.30 to 0.85. Superior results are obtained when the water activity of the present foods ranges from about 0.60 to 0.75, particularly when dried juice material is used to provide the juice vessicle solids. In general, the food products of the present invention having lower water activities will exhibit tougher, more chewy attributes. Food products having higher water activities, on the other hand, will be softer and more tender organoleptically.

The water activity of the present food products is controlled by two factors. First, the moisture content of the present food products influences measured water activity. Higher moisture contents tend to increase water activities. Second, the water activities of the present food products are influenced by the water binding capacities of the ingredients employed to realize the present food products and the levels at which these materials are employed. When materials having high water-binding capacities are employed, the water activities are lower for a given moisture content. For example, highly processed juice vessicle solids have a lower water binding capacity than equivalent solids amounts provided by raw juice vessicles. Thus, for a food product of the present invention having a given juice vessicle solids level and moisture level, a lower water activity is provided when raw vessicle material is employed. Similarly, the various sweetening agents differ in their water-binding capacity and thus will influence the water activity of the present food products. Therefore, the water activity can be simply controlled by varying the selection and mixture of ingredients as well as their concentrations to provide products having whatever water activities and, thus, textural properties which are desired.

A wide variety of direct and indirect analytical techniques exist which accurately measure food products water activities and are well known in the food art. Indirect methods of water activity measurement are especially popular due to the availability of easy-to-use electric hydrometers. A more detailed discussion of numerous water activity measurement techniques and measurement apparatus can be found in "Water Activity and Food", by John A. Troller and J. H. B. Christian, (1978), Chapter 2, pp. 17-28, published by Academic Press, which is incorporated herein by reference.

E. Optional Components

The present food products containing juice vessicle solids can optionally contain a variety of additional ingredients suitable for rendering such food products more organoleptically desirable. Such optional components include pre-gelatinized starch, hydrophilic colloids, fruit material, fibrous material, flavors, coloring agents, and citrus pectin.

Pre-Gelatinized Starch

Highly preferred optional ingredients are those materials which serve as binders due to their water-binding capacities. One material of this type which is particularly preferred for use in the present food products is pre-gelatinized starch. Pre-gelatinized starch is particularly desirable due to its low cost, bland taste, and relatively higher water-binding capacity. If present, pre-gelatinized starch is present from about 1% to about 3% by weight of the composition. Preferably, pre-gelatinized starch comprises from about 1.2% to about 1.6% by weight of the present food products. The source from which the pre-gelatinized starch is derived is not critical and thus, pre-gelatinized starch from wheat, corn, tapioca and rice is suitable for use in the present food products.

Hydrophilic Colloids

Other highly preferred optional composition ingredients are those hydrophilic colloids which serve to further bind water in the food products of the present invention and thus modify the textural properties thereof. Suitable hydrophilic colloids can include natural gum materials such as gum tragacanth, locust bean gum, guar gum, algin, alginates, gelatin, Irish moss, and gum arabic. Synthetic gums such as water-soluble salts of carboxymethyl cellulose can be used. If present, hydrophilic colloids comprise from about 0.1% to about 0.5% by weight of the composition, preferably from about 0.3% to about 0.4% by weight of the composition.

Dyes, Coloring Agents and Flavors

Minor ingredients such as dyes, coloring agents and flavors can be added to the instant food products to improve the consumer acceptability of such products. If present, such agents generally comprise from about 0.1% to 2% by weight of the present food products. For example, a red color may be imparted by F.D. & C. Red No. 40 in a minor amount of, say, 0.01% for use in a raspberry or cherry-like product.

Miscellaneous Fruit Material

Other highly preferred optional ingredients are those materials which add fruit material to the present food products. Suitable materials include, for example, dehydrated fruit particles and fruit purees. Since a major portion of the fruit taste is imparted to the product by ingredients other than the fruit pieces, one type of fruit may be employed for different fruit-like products. Thus, the dried apple pieces or dried apricot pieces can be used in formulations for a strawberry or cherry product by varying the flavor and color of the food product to approximate that of the desired fruit. Suitable fruit particles are derived from dehydrated apple, pear, grape, cherry, apricot, strawberry or any fleshy fruit. Dehydrated fruit particles are comminuted to pass through 80 mesh U.S. Standard size sieves.

If present, the miscellaneous fruit materials generally comprise from about 5% to 30% of the food product on a solids basis.

Food Product Preparation

The food products of the present invention are prepared by admixing the essential and optional ingredients together in such a manner as to produce a cohesive mass. In a preferred method of food product preparation, the procedure involves:

(1) Mixing the heavy wet ingredients (e.g., raw juice vessicles, corn syrup, dried fruit, purees, etc.) to form a heavy wet mixture;

(2) mixing the minor wet ingredients (e.g., color, flavors) together in water and adding the minor wet mixture to the heavy wet mixture to form a main mix;

(3) mixing the dry items (e.g., sucrose, anhydrous citric acid, dextrose, highly processed juice vessicles) to form a dry mix;

(4) blending the dry mix into the main mix to form a food product formula;

(5) shaping the food product formula to any desired geometric configuration;

(6) if needed, drying the shaped food product formula to form the final food products of the present invention; and (7) packaging the present food products.

A drying step is generally used when substantial amounts of the juice vessicle solids component of the present food products is supplied by raw juice vessicles or processed juice vessicles having high moisture contents. Similarly, a drying step is desirably employed when added water which is more moisture than is desired in the final food product is used to aid the blending of the ingredients. A highly preferred drying technique is oven/forced air drying.

Generally, a separate heating step to ensure microbial stabilization is not required in the preparation of the present food products. The present food products are shelf stable against both microbial attack and against moisture loss for extended periods. However, an additional heat stabilization step is optionally employed for additional microbial stabilization. Such heat stabilization steps typically involve heating at temperatures above 180° for periods of from 0.15 to 1.0 hours. Alternatively stated, the microbial heat stabilization step involves heating the present food products to achieve internal temperatures of greater than about 180° and maintaining the product temperature for about 0.2 to 1.0 hours.

It will be recognized that the physical and textural properties of the present food product can be varied by altering the method of preparation. The skilled artisan will be able to select food product preparation means and method suitable for providing food products of desired physical form, consistency and texture.

The present compositions can be packaged in any suitable container including packets, tubes, cartons, and boxes. If individual wrapping is desired, the wrapping material can be paper, polyester, foil or the like. There is no necessity for the wrapping to be airtight so as to avoid moisture loss although heat sealing is preferred.

The food products of the present invention containing juice vessicle solids are illustrated by the following examples:

EXAMPLE I

The following formulation is prepared:

TABLE I

| Ingredient | Before Drying | | | |
|---|---|---|---|---|
| | Amount | Solids | Water | % Water |
| Corn Syrup | 20g | 12g | 8g | 40% |
| Sucrose | 36.7 | 36 | .7 | 2 |
| Raw Orange Vessicles | 1000 | 80 | 920 | 92 |
| Citric Acid | 7.2 | 6.84 | .36 | 5 |
| Gelatin | 1.56 | 1.46 | 0.10 | 9.4 |
| Pre-gelatinized Starch | 3.1 | 2.88 | 0.25 | 8 |
| Xanthan Gum | .76 | .72 | .05 | 5 |
| Glycerin | 6.72 | 6.72 | 0.0 | 0.0 |
| Flavoring & Color | .185 | .18 | .005 | 3.0 |
| | 1076.22g | 146.77g | 929.45g | |

Such a formulation is prepared by first mixing together the heavy wet items including the corn syrup and the raw orange vessicles in a Hobart Paddle Mixer. To this wet mixture is added a mixture of the glycerin, flavoring and color. Mild agitation is continued until the wet mixture is well mixed. A dry mixture is prepared by hand-mixing the sucrose, citric acid, starch, gelatin and gum. Then, the dry mixture is added to the wet mixture in the Hobart Paddle Mixer and the formulation is well mixed with mild agitation. The resulting formulation has a pudding-like consistency.

The formulation is extruded into a ½-inch diameter roll through a Selo stuffer at a pressure of 0 to 50 p.s.i.g. The roll extrudate is sectioned into two pieces, each of approximately five inches. The cylindrical pieces weighing approximately 30 g are then placed into an oven and held at 140° for 14 hours. After drying, the food products of the present invention now measure approximately five inches in length and together have the following composition:

TABLE II

| Ingredient | As Consumed | |
| --- | --- | --- |
| | Solids | Weight % |
| Corn Syrup | 12g | 6% |
| Sucrose | 36 | 18 |
| Raw Orange Vessicles | 80 | 40 |
| Citric Acid | 6.84 | 3.42 |
| Water | 53.2 | 26.6 |
| Gelatin | 1.46 | .73 |
| Pre-gelatinized Starch | 2.88 | 1.44 |
| Xanthan Gum | .72 | .36 |
| Glycerin | 6.72 | 3.36 |
| Flavoring and Color | .18 | .09 |
| | 200g | 100.00% |

The food products so produced have a pH of about 4.2 and a water activity of about 0.68. The food product when consumed exhibits a tender texture similar to licorice.

The food products are then packaged in a suitable cellophane wrapper. The combination of low water activity and low pH renders the samples shelf stable for extended periods. Moreover, little moisture loss is observed.

Food products of substantially similar physical and organoleptic character are realized when in the EXAMPLE I formulation all or part of the citric acid is replaced with an equivalent amount of ascorbic, phosphoric, tartaric, malic acids or mixtures thereof, or the sodium or potassium salts thereof.

The formulations of TABLE I are also suitably stuffed into an edible casing. The casings are hung and, optionally, heat treated for 15-20 minutes at 200°. Thereafter, the casings are forced air dried at 140° to 180° for about 14-18 hours to a moisture level of 12%. The food products containing 12% moisture and having a water activity of 0.35 are very tough having a beef-jerky texture.

EXAMPLE II

A food product of the present invention in the form of a cylindrical food stick weighing about 100 g is prepared and has the following formulation:

| Component | Amount | Weight % |
| --- | --- | --- |
| Corn Syrup[1] | 8g | 4.8% |
| Sucrose[2] | 15 | 14.7 |
| Fructose[3] | 7 | 6.8 |
| Processed orange vessicles[4] | 64.2 | 47.4 |
| Anhydrous citric acid | 3 | 3 |
| Moisture | — | 20 |
| Glycerin | 3 | 3 |
| Flavor (strawberry) | 0.1 | 0.1 |
| Color (F.D. & C. No. 40) | 0.2 | 0.2 |
| | 100.0g | 100.0% |

[1]40% moisture, 43° Be, 43° D.E.
[2]2% moisture
[3]2% moisture
[4]26% moisture

Such a food product is prepared in a manner similar to that described in EXAMPLE I. However, approximately 235 grams of raw orange vessicles (95% moisture) are first drum dried at 268° for a residence time of 1 minute until the processed orange vessicles have a moisture content of about 25%. Then, the processed orange vessicles are mixed together with the corn syrup, glycerin, flavor and color to form a wet mix. A dry mix of the sugar, fructose and citric acid is prepared. The dry mix is thereafter blended into the wet mix to form the full formulation. The full formulation is extruded into a long, cylindrical shape and cut into sections to produce the food product.

The food product so produced has a pH of about 4.0 and a water activity of about 0.65. The food product when consumed exhibits a chewy texture similar to dried fruit.

Food products of substantially similar physical and organoleptic character are realized when in the EXAMPLE II composition all or part of the sucrose is replaced with an equivalent amount of dextrose, glucose, maltose, maple syrup solids or apple juice powder.

EXAMPLE III

Fruit Leather

The following formulation is prepared:

| Ingredient | After Drying | |
| --- | --- | --- |
| | Solids | Weight % |
| Corn Syrup | 12g | 6.0% |
| Sucrose | 21.6 | 10.8 |
| Apple Powder[1] | 24.0 | 12.0 |
| Raw Orange Vessicles[2] | 72 | 36.0 |
| Processed Orange Vessicles[3] | 24 | 12.0 |
| Sodium Citrate | 1.2 | 0.6 |
| Citric Acid | 5.4 | 2.7 |
| (Moisture) | 32 | 16.0 |
| Citrus Pectin | 1.8 | 0.9 |
| Pre-gelatinized Starch | 3.46 | 1.73 |
| Locust Bean Gum | 0.96 | 0.48 |
| Flavoring and Color | 1.58 | 0.79 |
| | 200.0g | 100.0% |

[1]70% by weight sugars
[2]94% moisture by weight of the vessicles
[3]10% moisture by weight of the vessicles Such a formulation is prepared in a manner similar to the procedure of EXAMPLE II. However, the additional raw orange vessicles are added to the heavy wet mixture. The entire moisture content of the final food products is derived from the moisture associated with the basic ingredients, principally from the raw orange vessicles.

The formulation described above is spread onto a sheet at a thickness of 1/16 to ⅛ inch. This material is dried for a period of two hours at a temperature of 160° in a forced air oven, cut into strips or chips. The moisture content of the product is 18% after drying. The water activity is 0.70 while the pH is 4.3. The texture of this product is chewy. It is useful as a snack food item.

What is claimed is:

1. A shelf-stable, elastic, solid form food product exhibiting prolonged moisture retention, comprising:
   A. from about 12% to 40% by weight of a nutritive carbohydrate sweetening agent;
   B. from about 20% to 90% by weight orange citrus juice vessicle solids wherein the orange citrus juice vessicle solids comprise a mixture of:
      (1) pasteurized raw orange citrus juice vessicles having a moisture content of about 95% to about 98% by weight of said raw juice vessicles, and
      (2) highly processed orange citrus juice vessicles having a moisture content of about 3% to about 12% by weight of said highly processed juice vessicle solids,
      wherein the weight ratio of solids provided by the raw juice vessicles to the solids provided by the highly processed juice vessicle solids ranges from about 10:1 to about 20:1;

C. sufficient amounts of edible organic acid to provide a pH of from about 2.5 to 4.5; and D. a moisture content of about 8% to 30% by weight; said food product having a water activity of from about 0.30 to 0.85.

2. The food product of claim 1 comprising from about 22% to 45% by weight orange citrus juice vessicle solids.

3. The food product of claim 2 comprising from about 30% to 40% by weight orange citrus juice vessicle solids.

4. The food product of claim 3 containing from about 15% to 30% by weight of a nutritive carbohydrate sweetening agent, and sufficient amounts of an edible organic acid to provide a pH of from about 3.0 to 4.3.

5. The food product of claim 4 comprising from about 18% to about 24% by weight of the nutritive carbohydrate sweetening agent, and sufficient amounts of an edible organic acid to provide a pH of from about 3.8 to 4.2.

6. The food product of claim 5 having a water activity of from about 0.60 to 0.75.

7. The food product of claim 6 wherein the nutritive carbohydrate sweetening agent is selected from the group consisting of sucrose, invert sugar, dextrose, lactose, honey, maltose, fructose, maple syrup, and corn syrup solids.

8. The food product of claim 7 wherein the edible organic acid is selected from the group consisting of citric acid, succinic acid, tartaric acid, malic acid, acetic acid, lactic acid, itaconic acid, and adipic acid.

9. The food product of claim 8 additionally comprising from about 5% to about 30% by weight of the food product of dehydrated fruit particles having a particle size such that the fruit particles pass through an 80 mesh U.S. Standard size sieve.

10. The food product of claim 9 additionally comprising from about 1% to 3% by weight of pre-gelatinized starch.

11. The food product of claim 6 wherein the nutritive carbohydrate sweetening agent is selected from the group consisting of sucrose, corn syrup solids and fructose.

* * * * *